May 26, 1959 R. SCHARDT 2,887,890
MOTION TRANSMITTING MEMBERS
Filed Oct. 1, 1957 4 Sheets-Sheet 1

Rudolf Schardt
INVENTOR.

BY Arnold and Stidham

May 26, 1959 R. SCHARDT 2,887,890
MOTION TRANSMITTING MEMBERS
Filed Oct. 1, 1957 4 Sheets-Sheet 3

Rudolf Schardt
INVENTOR
BY Arnold Stidham

May 26, 1959 R. SCHARDT 2,887,890
MOTION TRANSMITTING MEMBERS
Filed Oct. 1, 1957 4 Sheets-Sheet 4

Rudolf Schardt
INVENTOR.
BY Arnold and Stidham

United States Patent Office 2,887,890
Patented May 26, 1959

2,887,890

MOTION TRANSMITTING MEMBERS

Rudolf Schardt, Houston, Tex., assignor, by mesne assignments, to Dresser Industries, Inc., Dallas, Tex., a corporation of Delaware Application October 1, 1957, Serial No. 687,393

9 Claims. (Cl. 74—110)

This invention relates to new and useful improvements in motion transmitting members and is particularly applicable to the reproduction of seismic records.

In the seismic surveying field, seismic records are made by generating sonic waves which traverse the earth's sub-surface formations and are reflected back from sub-surface strata to be received by geophones at the surface. When the speed of sound traveling through the earth's sub-surface formation in the area of exploration is known, the time of travel of a seismic wave transmitted vertically through the earth's subsurface formations and reflected vertically back to the surface is directly indicative of the depth of the strata from which it is reflected. However, in practice it is rarely practical to situate a group of geophones at the shot point to receive only vertically traveling seismic wave components and usually, a plurality of geophones are used, they being spaced at varying distances from the shot point. Consequently, in order to integrate or coordinate properly, the recording of signals reflected from a given strata to each of several geophones, compensation must be made for the increase in time of travel of each signal due to the inclined paths followed with the horizontal spacing of the geophones. However, the discrepancy between true time of travel and vertical time of travel is not constant throughout the seismic record because the true paths of travel become more nearly vertical as infinite depth is approached. Various devices and methods have been employed to introduce compensating factors in the recording of seismic events to eliminate these time discrepancies or "move-out errors." In accordance with preferred practice, the traces of seismic records made in the field are reproduced by play back heads which are staggered in accordance with the difference in move-out error among the traces at each stage of the record. But few previous devices have succeeded in accomplishing the desired gradual return of the compensating devices from maximum displacement at the beginning of each record trace where shallow events are recorded toward a normal, undisplaced disposition as infinite depth is approached.

It is, therefore, an object of my invention to provide an apparatus for producing controlled movements of members associated with seismic record reproducing devices from a position of maximum displacement to a normal, undisplaced position.

It is a further object of my invention to provide a cam member selectively pivotable about an axis on its intelligence surface so that a cam follower, moving toward the axis, is returned from a position of maximum displacement measured by the disposition of the cam about the axis to a normal, uncorrected position.

In carrying out my invention, I provide a series of cam followers operatively connected to seismic recording or play back devices so as to transmit motion thereto. Each follower is urged into engagement with an elongate cam surface on one of a series of actuators mounted on a carriage which is movable under the followers. Each actuator is pivoted independently about an axis passing through its own cam surface so that regardless of the amount an actuator is pivoted to dispose its active surface at an angle to the path of movement of its axis, the displacement of the follower decreases to absolute zero as it approaches the axis.

Other objects and advantages of my invention will become apparent from the specification following when read in view of the accompanying drawings wherein.

Figure 1:
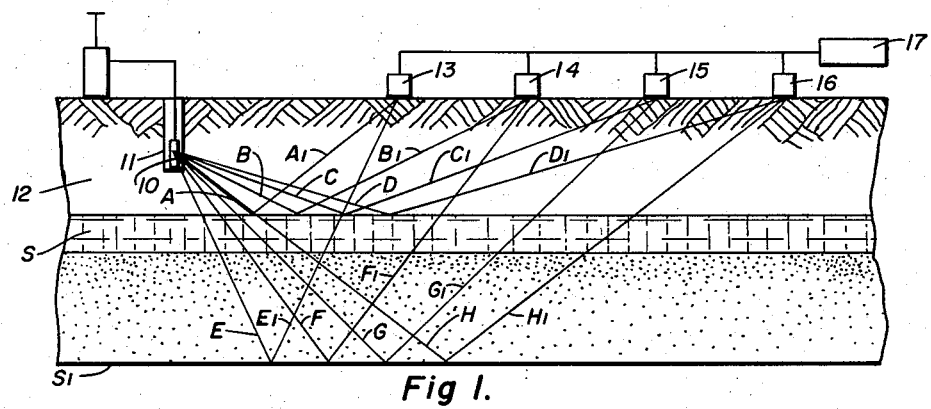
Fig. 1 is a schematic diagram illustrating the manner in which seismic field record is made and showing the receiver geophones spaced at varying distances from the detonated charge.
Figure 2:
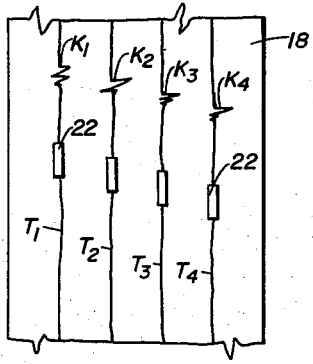
Fig. 2 is a partial view of a field seismic record illustrating the move-out errors in the original traces.

Referring to Fig. 1, which is a schematic diagram illustrating the usual seismic survey method, a suitable charge or shot 10 is detonated within a shothole 11 and the detonation of such charge or shot generates seismic waves which traverse the earth's sub-surface formations. For example, a seismic wave A travels downwardly from the shot or charge through a sub-surface formation 12 and is reflected upwardly from the upper surface of a strata S, the reflected wave being indicated by A1. A geophone receiver 13 receives the reflected wave and at the instant of reception generates an energy impulse. Similarly, a wave B is reflected as indicated by B1 and is received by geophone 14; waves C, C1 and D, D1 are similarly received by geophones 15 and 16. Other seismic wave components E, F, G and H are reflected from a deeper strata S1 to the same geophones 13 to 16. It is noted that the geophones are spaced at different points from the shothole 11. Therefore, assuming the same velocity for all wave components, the time between detonation of the charge and the reception by the geophones will likewise differ. A recorder unit shown schematically at 17 impresses on a recording medium 18 (Fig. 2), such as paper or magnetic tape moving at constant velocity, a series of traces T1 to T4, each trace indicating signals received from a particular geophone 13 to 16, respectively. The electrical energy impulses generated at each geophone 13 to 16 in response to reception of a reflected seismic wave are transmitted to the recorder unit 17 producing kicks or excursions K1 to K4 in the traces being recorded. Since the recording medium moves at constant velocity, the length of each trace from initial firing time to a signal excursion will be representative of the time of travel of a seismic wave to and from a reflecting horizon, such as the strata S. Consequently, corresponding signals in the various traces representative of seismic waves reflected from the same horizontal strata will naturally be out of transverse alignment corresponding to their different instants of reception at their respective geophones.

Figure 4:
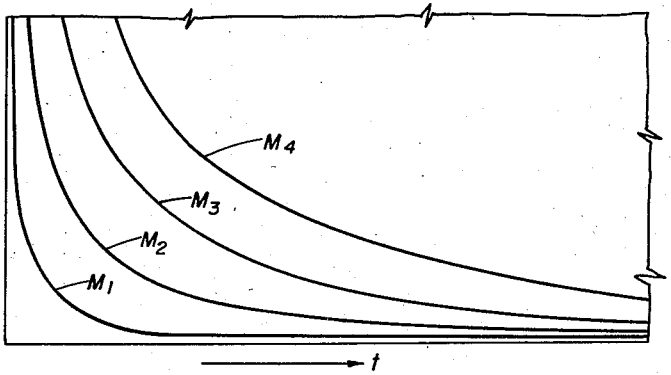
Fig. 4 is a graphical illustration of move-out curves.

In the graph of Fig. 4, a series of move-out curves M1 to M4 are plotted to depict the effect of move-out on the accuracy of seismic records. Each curve indicates the time error $\Delta t$ or delay of the seismic wave at any given instant $t$ during the recording period caused by the spacing of the geophone from the shot point. Curve M1 represents the error introduced in the recording of signals from geophone 13 at minimum move-out with curves M2 to M4 showing the effect of the progressively greater move-out spacing of geophones 14, 15 and 16.

Each of the curves illustrates a substantial time difference for move-out error in the early time periods of the record. Obviously, at shallow depths move-out is more significant because of the diagonal paths of the generated and the reflected waves. As greater depths are reached, i.e. as the recording period progresses, the angle of the wave paths to the vertical become smaller and error due to move-out falls off, first sharply and then gradually until the move-out error $\Delta t$ becomes negligible, which as a practical matter occurs at a depth of about 15,000 feet. Curves M1 to M4 are similar and proportional, successively reflecting a greater move-out error $\Delta t$ at any instant $t$. Of course, the differences in move-out error themselves decrease as all curves M to M4 move toward zero as infinite time is approached.

Figure 3:
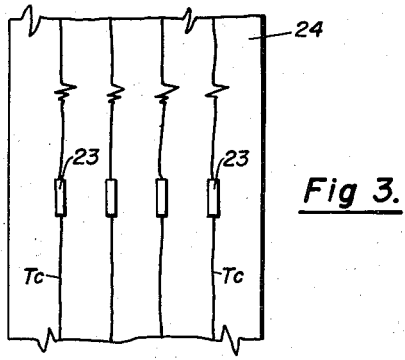
Fig. 3 is a partial view of a corrected seismic record.
Figure 5:
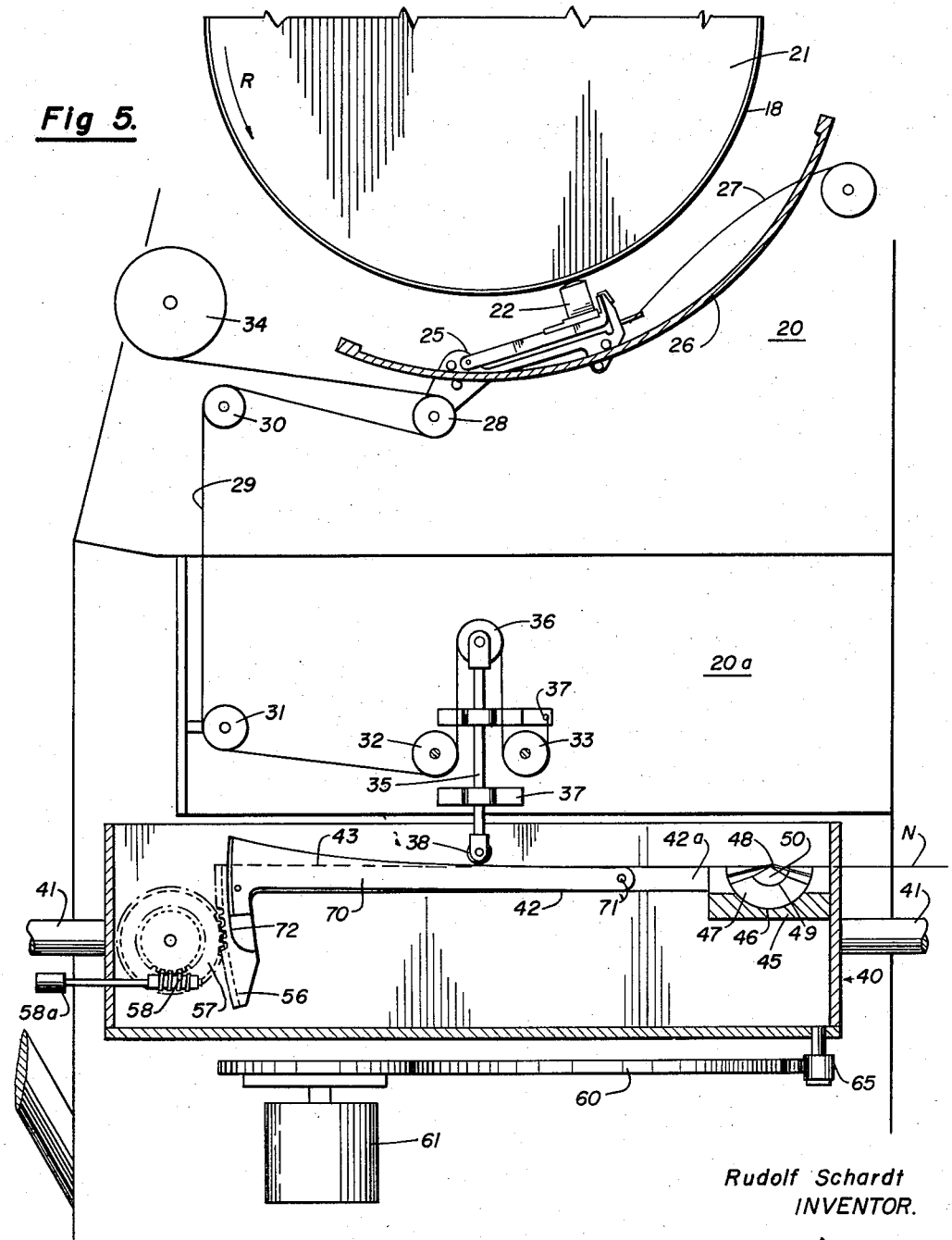
Fig. 5 is a diagrammatic elevation in partial section of apparatus constructed in accordance with the invention.

My invention is particularly adaptable to apparatus for reproducing seismic records while correcting for such move-out errors and will be described herein as employed for that purpose. However, it is to be expressly understood that the invention is not to be restricted to such use. Apparatus of this type is shown in Fig. 5 and includes a frame 20 in which is rotatably mounted a drum 21 adapted to carry a magnetic tape 18 or other record medium. The record tape 18 has impressed thereon the traces T1 to T4 reflecting seismic signals received at the geophones and is therefore referred to as an uncorrected seismic field record. Disposed adjacent to the periphery of the drum 21 is a transverse array of movable heads 22, each of which is adapted to "read" or reproduce the traces impressed on the seismic record 18 as it is moved by. Preferably, magnetic tapes are employed as a record medium, in which case the heads 22 may be magnetic readers or pickup heads adapted to play back and transmit signals from the magnetic impressions on the record 18 to a second, axially aligned array of re-recording heads 23 which impress a corrected reproduction TC of the field record traces on a separate recording medium 24 (Fig. 3). The record drum 21 rotates at a constant velocity by any conventional means (not shown) in the direction of the arrow R. Therefore, each increment of arcuate length around its circumference is representative of a given period of time. Consequently, if the reproducing heads 22 were advanced independently along the periphery of drum 21, each by an amount equal to the move-out error $\Delta t$ in the appropriate trace at any given instant, the move-out error would be eliminated from the reproduced signal transmitted to the second array of recording heads 23. Since the move-out error $\Delta t$ decreases with depth, i.e. time, all of the reproducing heads 22 must be retracted toward their normal, uncorrected position as infinite depth and time are approached. While, of course, the depth of infinity is only attained theoretically, the reduction of the correcting move-out factor toward zero is extremely important because, as a practical matter, move-out errors due to conventional geophone spacing are substantial during early recording periods representative of shallow depths but become negligible at depths well within the present range of seismic exploration. The appropriate compensatory movement of recording heads 22 is achieved by use of my motion transmitting apparatus.

Each head 22 is mounted on a carriage 25 which traverses, in sliding or rolling contact, arcuate guideway 26 supported on the frame 20 of the machine. The bearing surface of slideway 26 is concentric to the periphery of drum 21 so that, throughout its movement, each recording head is in operative position relative to the seismic record 18. Each carriage 25 is urged by a constant force spring 27 in the direction of drum rotation toward a normal, uncorrected position for the play back head 22. Rotatably carried on each carriage 25 is a sheave 28 guided along and driven by a cable 29 threaded over pulleys 30, 31 and 32, each rotatably carried on the frame 20, the pulleys for each cable being mounted on a separate panel 20a. Both ends of each cable 29 are anchored to the frame 20 at 33 and 34. One anchor point 34 may constitute a spindle for initial adjustments of the cables 29 to set the uncorrected positions of carriages 25. Thus, fixed corrections, such as weathering and elevation can be set initially. It is apparent from the drawing that if any portion of a cable were pulled in a direction transverse to its normal disposition, the cable would be tensioned longitudinally and the particular carriage 25 to which it is attached would be moved to the left in Fig. 5 against the force of the corresponding spring 27. The transverse displacement of a cable is accomplished by movement of a vertically slidable rod or follower 35 having a pulley 36 at the upper end thereof also engaging cable 29. The rods 35 are slidably mounted on frame 20 by retainers 37, and each rod 35 has a roller 38 at the lower end thereof.

A cam carriage 40 is slidably mounted on as on rods 41 for horizontal reciprocal movement on the frame 20 under the followers 35. A plurality of actuators 42, one for each follower 35, is supported in a carriage 40 so that all are movable horizontally as a unit. Each actuator 42 may be selectively and adjustably set in a given disposition relative to the horizontal so that a predetermined motion will be transmitted to the followers 35 and hence the play back heads 22, as the carriage 40 moves below the followers 35. A bank of actuators 42, corresponding to the number of followers 35 and heads 22 are nested in a bearing block 45 which is secured to the actuator carriage 40 so as to move therewith. The bearing block 45 has an internal arcuate bearing surface 46 therein adapted to receive an arcuate bearing 47 carried on one end of each actuator 42. The bearing 47 is of substantially the same radius as that of the bearing block surface 46 and, significantly, their common center of curvature lies on axis 48, precisely on the intelligence surface 43 of the actuator 42. The bearing sector 47 on each actuator 42 is pivotally received within the bearing block 45 with the shank 42a of each actuator being received in an accommodating slot 45a on the bearing block. Formed in the upper portion of each journal 47 on opposite sides of the actuator shank 42a are concave bearing surfaces 49 also concentric to the outer bearing surface 46 so as also to be centered on the axis 48. Adapted to bridge and be received within two adjacent concave bearing surfaces is a convex bearing sector 50 of substantially the same radius as the concave bearing surface 49. Each convex sector is urged radially against the concave bearing surface of each journal by means of a bow spring 51 rotatably carried on a pivot pin 52 extending across each of a series of slots 53 adapted to receive the shank of the bow spring. After a convex sector 50 is in place across the concave bearing surfaces 49 of two adjacent actuators 42, a bow spring 51 is pivoted downward to exert a radial force to clamp down on the bearing sector 50 and secured in this position by a snaplock 53a slidable on the spring 51 and engaging under an abutment pin 54 extending across an accommodation within a recess 55 provided therefor on the opposite side of the bearing block 45. The structure shown permits the close nesting of a substantial number of actuators in the relatively small space and, therefore, is particularly appropriate for use in seismic reproduction apparatus wherein the movements of twenty or thirty heads must be controlled.

Under the force of bow springs 51 the internal concave surface 46 of the bearing block and the convex surface of the journal sector 47 are in circumferential sliding engagement and, therefore, each actuator 42 is pivotable about the common center of curvature of the bearing surfaces, 46 and 47 and, hence, about a point on its own intelligence surface.

At the end of each actuator 42 is a depending gear segment 56 engageable by a pinion 57 independently rotatable on the frame 20. Close manual adjustment of each actuator 42 into a predetermined disposition relative to a horizontal plane N containing the pivotal axis 48 is provided by a worm 58 journaled in the frame and rotatable by knurled head 58a or the like.

Initially each follower 35 is adjustably set so that when no displacement is to be transmitted to heads 22, the follower rollers 38 will lie on the horizontal plane N containing the common pivotal axis 48 of the actuators 42. Then, each auctator is independently pivoted through its pinion 57 an amount sufficient to effect a desired initial displacement of its cam follower 35 in accordance with calculated initial move-out errors. The vertical displacement of the various followers may vary at any given distance from the axis 48 due to independent adjustment, but as the carriage 40 moves to the left in Fig. 5 all of the cam followers will return toward the neutral plane N which position will be reached simultaneously by all followers when the common pivotal axis 48 passes under the rollers 38.

Figure 6:
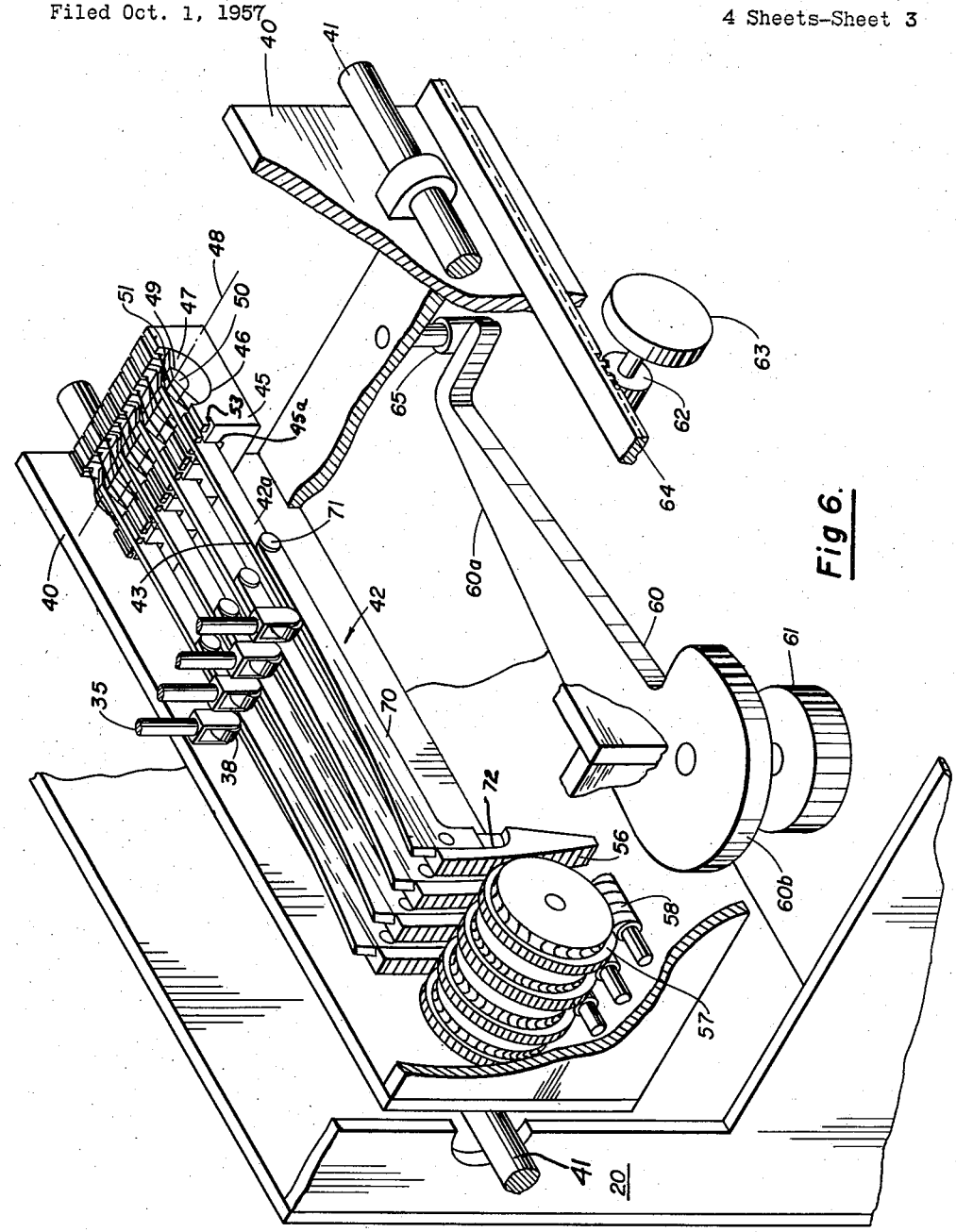
Figs. 6 and 7 are isometric views in partial section showing portions of my apparatus.

As we have seen from reference to the move-out curves of Fig. 4 displacement of the geophones from the shot point has its greatest influence upon the time of arrival of reflected waves at the early stage in the record when the reflections from shallower depths are received. Consequently, if the motion accorded the entire carriage 40 is rapid at first and then gradually slows so that a given displacement of an actuator will have a greater effect at the initial stage of the operating cycle than at the later stages, and this motion can be controlled so that any displacement of an actuator 42 will transmit diminishing movement to the appropriate head 22 approximating the move-out curve. This motion can be accomplished by means of a master cam 60 driven by motor 61. A pinion 62 (Fig. 6) driven by a constant force spring 63 engages a rack 64 on the main actuator carriage 40 to urge a cam follower 65 into constant engagement with the master cam 60.

It will be seen that when the master cam 60 is driven through a cycle of operations, the actuator carriage 40 will move rapidly during the initial stages of record reproduction as the cam follower 65 moves along the portion 60a of master cam 60 and the velocity of the carriage 40 is gradually reduced along portion 60b of the master cam. Consequently, an actuator pivoted above neutral plane N will produce at first a sharp motion in its associated follower 35 and hence the play back head 22. Since each actuator is pivoted about the common axis 48 on its intelligence surface and on the neutral plane N, all followers 35 ultimately reach an undisplaced position as their rollers 38 move along the cam surfaces 43.

Figure 7:
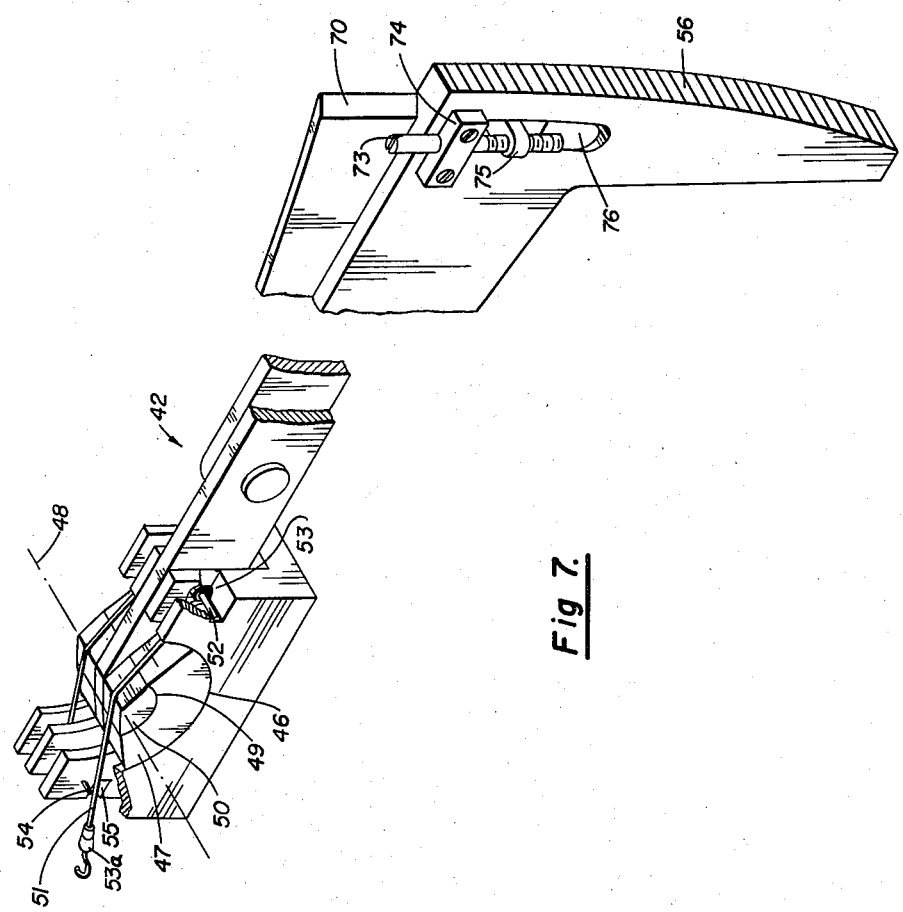

For all practical purposes the move-out curves M1 to M4 can be approximated by varying the disposition of actuators 42 in a lineal relationship. Thus, if the intelligence surfaces 43 were straight, any differences in move-out from the shot point compensated for by merely pivoting the actuators 42, the move-out curves M1 to M4 will, for most purposes, be effectively duplicated in the motion transmitted to the play back heads 22. However, since the effects of geophone move-out are greatest at the shallower depths, the true move-out curve for a given geophone spacing may vary, particularly during the early recording period, from a curve merely bearing a lineal relationship with a typical move-out curve for the area under seismic exploration. Consequently, it may be found desirable to minimize errors in the early portion of the curve by varying the profile of the cam surface 43. For this purpose, I provide an auxiliary cam 70 pivoted at 71 on the shank 42a of each actuator 42 and, preferably, received in a guideway 72 provided therefor. The auxiliary cam surface 70 blends smoothly into the cam surface 43 of its actuator. While it is obvious that any suitable form of adjustment may be employed to secure the auxiliary cam in a selected position on the actuator 42, I have shown (Fig. 7) a screw 73 journaled in a bracket 74 on the actuator and engaging an internally threaded block 75 secured to the auxiliary cam 70 and extending through a slot 76 in the actuator. A thrust bearing (not shown) engages the bearing mounting 74 so that rotation of the screw 65 will thread it into the block 75 to cause pivotable movement of the auxiliary cam 70 about the pivot 71.

In operation of my device, the master cam 60 is selected to produce a normal move-out curve calculated from area information for any pivotable setting of the actuators. Next, each actuator is set by rotation of the worms 58 to introduce any variations from the normal move-out curve representative of varying distances from the shot point. Next, the auxiliary cam 70 is adjusted if necessary to compensate for variance of the true curve for a given move-out from the proportional curve produced by pivotal adjustment of the actuators 42. Then, with the drum 21 rotated and carriage 40 set in motion against the master cam 60 a prescribed motion is produced in play back heads 22 to eliminate move-out error produced in the field seismic record 18 whereby the play back heads 22 transmit corrected signals to the aligned recording heads 23.

The foregoing disclosure and description of the invention is illustrative and explanatory thereof, and various changes in the size, shape and materials, as well as in the details of the illustrated construction, may be made within the scope of the appended claims without departing from the spirit and scope of the invention.

Having described my invention, I claim:

1. Apparatus for producing controlled movements of a member comprising a carriage, means for producing a relative movement between said carriage and said member along a longitudinal path, an actuator pivotably mounted on said carriage about a fixed axis perpendicular to said path, an elongate cam surface on said actuator extending through said fixed axis, means for pivoting said actuator to dispose said cam surface in a selected angular relationship with said path, said member being movable transverse to said path, and yieldable means biasing said member into engagement with said cam surface.

2. Apparatus for producing controlled movements of a member comprising a carriage movable along a fixed longitudinal path, an actuator pivotably mounted about a fixed axis on said carriage for rotation thereon in an active plane parallel to said path, an elongate cam surface on said actuater extending through said fixed axis, means for pivoting said actuator to a selected position with said cam surface in a predetermined angular relationship to said path, said member being mounted for movement in said active plane transverse to said cam surface, and yieldable means biasing said member into engagement with said cam surface.

3. Apparatus for producing controlled movements of a vertically movable member comprising a carriage movable along a fixed horizontal path, an actuator pivotably mounted on said carriage about a horizontal axis perpendicular to said path, an elongate cam surface on said actuator extending through said axis, means for pivoting said actuator a predetermined amount, and yieldable means urging said member into engagement with said cam surface.

4. Apparatus for producing controlled movements of a plurality of members, all of said members being movable in a common plane, said apparatus comprising a carriage, means for producing relative movement between said carriage and said members in a direction transverse to said common plane, a plurality of actuators pivotably mounted on said carriage about a common axis parallel to said common plane, each of said actuators being pivotable independently, an elongate cam surface on each of said actuators extending through said common axis, means for selectively pivoting each of said actuators a predetermined amount, and yieldable means biasing each of said members into engagement with the cam surface on one of said actuators.

5. Apparatus for producing controlled movements of a plurality of members as defined in claim 4, including an auxiliary cam member mounted on at least one of said actuators to pivot about a second axis parallel to said common axis, an auxiliary cam surface on said auxiliary cam member engageable by the one of said members engageable with the elongate cam surface of said one actuator, said auxiliary cam surface being co-planar with said elongate cam surface on said one actuator along a portion of its length, and positioning means for holding said auxiliary cam member with said auxiliary cam surface in selected position relative to said elongate cam surface.

6. Apparatus for producing controlled movements of a member comprising a carriage movable along a longitudinal path, a concave bearing surface on said carriage, an elongate actuator, a cam surface along the length of said actuator, a journal member secured to and depending from said actuator, said journal member having a convex bearing surface thereon, said concave and convex bearing surfaces being of substantially the same radius and having their common axis on said cam surface, said axis being perpendicular to said path, means mounting said journal member on said carriage with said concave and convex bearing surfaces in relative angular slidable engagement, said member being mounted for movement transverse to said cam surface, and yieldable means biasing said member into engagement with said cam surface.

7. Apparatus for producing controlled movements of a member comprising a carriage movable along a horizontal path, a concave bearing surface on said carriage, an elongate actuator member, a cam surface along the length of said actuator member, a journal member secured to and depending from said cam member, said journal member having a convex bearing surface thereon, said concave and convex bearing surfaces being of substantially the same radius, the axis of said convex surface being on said cam surface, means securing said journal member on said carriage with said concave and convex bearing surfaces in relative angular sliding engagement with their common axis being disposed horizontally and perpendicular to said path, said member being mounted for vertical movement, and yieldable means urging said member into engagement with said cam surface.

8. An apparatus for producing controlled movements of a member, including a carriage movable along a longitudinal path, an actuator mounted on said carriage and having a cam surface disposed along said longitudinal path, said member being yieldably urged into engagement with said cam surface, the combination with said apparatus of means for pivoting said actuator about the cam surface thereon, said means comprising a journal secured to and depending from said actuator, said journal having a convex bearing surface thereon, the center of curvature of said convex bearing surface being situated on said cam surface, a concave bearing surface on said carriage, the axis of said concave bearing surface being perpendicular to the planes of said path and said member, said concave and convex bearing surfaces being of substantially the same radius, means securing said journal member on said carriage with said concave and convex bearing surfaces in relative circumferential sliding engagement.

9. An apparatus for producing controlled movements of a vertically movable member including a carriage movable along a horizontal path, an actuator carried on said carriage and disposed along the vertical plane of said path, said actuator having a cam surface along the length thereof, and means urging said member into engagement with said cam surface, the combination with said apparatus of means for pivoting said actuator about its own cam surface comprising a support member securing to and depending from said actuator, said support member having a convex bearing surface, and a concentric concave journal surface, the center of curvature of said bearing and journal surfaces being situated on said cam surface, a concave bearing surface on said carriage, said convex and concave bearing surfaces being of substantially the same radius, the axis of said concave bearing surface being perpendicular to said path, a bearing sector, said sector having a convex journal surface thereon, said concave and convex journal surfaces being of the same radius, said support member being carried on said carriage with said concave and convex bearing surfaces in relative circumferential sliding engagement, and said sector being seated on said support member with said concave and convex journal surfaces in relative circumferential sliding engagement, and means urging said sector radially against said support member.

No references cited.